L. A. WALSWORTH & E. F. MERRITT.
Insect and Bug Gatherer.
No. 205,984.   Patented July 16, 1878.
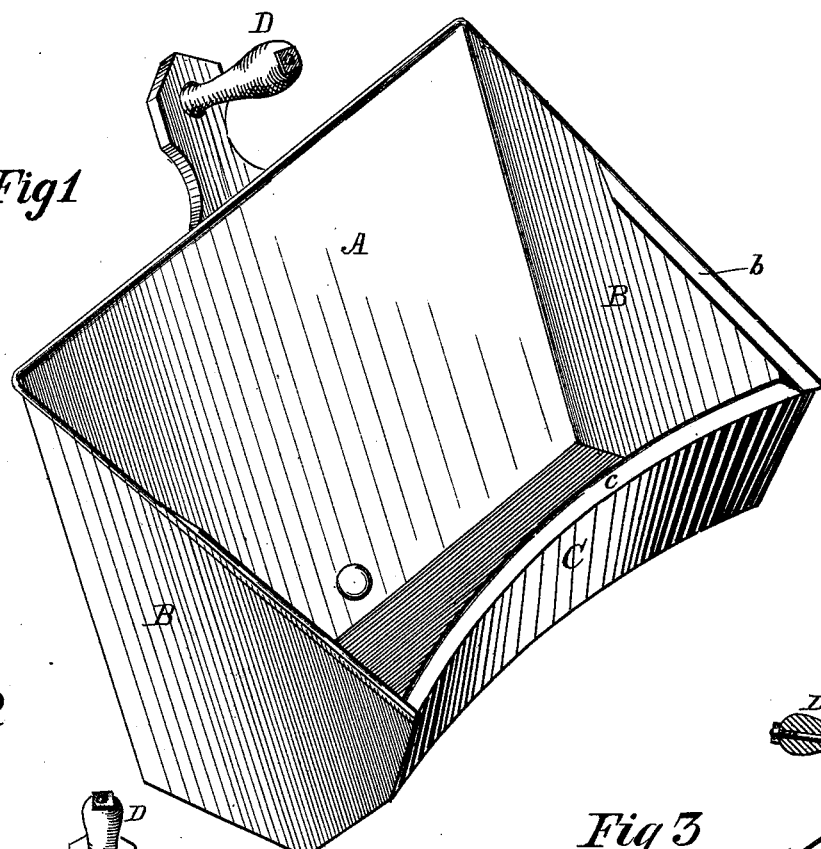
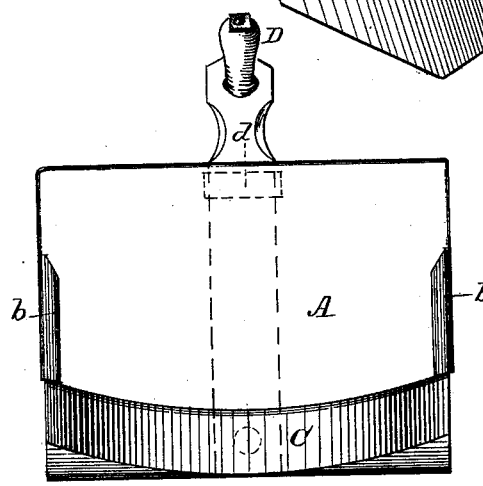
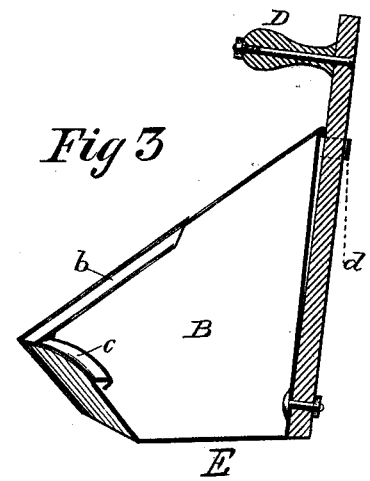
WITNESSES
Wilmer Bradford
J. D. Boutrong
INVENTOR
L. A. Walsworth
E. F. Merritt
per Edson Brothers
Attorneys

UNITED STATES PATENT OFFICE.

LURON A. WALSWORTH AND EGBERT F. MERRITT, OF UNION CITY, MICH.

IMPROVEMENT IN INSECT AND BUG GATHERERS.

Specification forming part of Letters Patent No. 205,984, dated July 16, 1878; application filed April 24, 1878.

*To all whom it may concern:*

Be it known that we, LURON A. WALSWORTH and EGBERT F. MERRITT, of Union City, in the county of Branch and State of Michigan, have made certain new and useful Improvements in Insect and Bug Exterminators; and we do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a perspective view of our invention. Fig. 2 is a front elevation, and Fig. 3 is a central transverse section.

Corresponding letters of reference are used in the different figures to indicate like parts.

The object of this invention is to provide a simple and cheap receptacle for use in exterminating insects, potato-bugs, &c., as they are removed from the vines; and it consists, principally, of a receptacle, constructed and arranged as hereinafter more particularly described and claimed.

In the drawings, A is the back; B, the sides, preferably tapering, as shown, with or without the lip *b*. C is the front, preferably made concave from side to side, and projecting outwardly and upwardly, and preferably having at its top edge a lip, *c*. The part C presents a broad surface to the plants, and prevents injury to them.

D is a handle, which may be passed through a bracket, *d*, and then bolted to the receptacle; or it may be secured in any other suitable manner.

Operation: The operator works on the right-hand row of potatoes, carrying the vessel in the left hand, and in his right hand a curved broom or other suitable instrument. Thus equipped, the operator brings the vessel forward to the vines with a quick motion, and simultaneously strikes them with his broom, and thus deposits in the receptacle the potato-bugs, as well as any other insects that may be upon the vines. The manner of using our device on other plants will be readily comprehended from this description.

In practice, we find it desirable to make the broom of a curvilinear form.

With our improved device one man can gather the bugs from three acres as quickly as another man can sprinkle one acre with Paris green.

As the bugs are gathered, as convenient a way for disposing of them as any is to dump them into a tub of water mixed with a quart of soft soap.

Having thus described our invention, what we claim, and desire to secure by Letters Patent, is—

The combination of the receptacle A, having the forwardly-projecting handle D, bottom E, partially lipped tapering sides B, and the upwardly and outwardly projecting concave lipped front C, substantially as shown and described.

In testimony that we claim the foregoing as our own we hereunto affix our signatures in the presence of two witnesses.

LURON A. WALSWORTH.
EGBERT F. MERRITT.

Witnesses:
M. A. MERRIFIELD,
ED. S. EASTON.